(No Model.)

O. T. JENSEN.
PLOW.

No. 481,630. Patented Aug. 30, 1892.

Witnesses

Inventor
Ole T. Jensen,
By his Attorneys,
C. A. Snow & Co.

UNITED STATES PATENT OFFICE.

OLE T. JENSEN, OF WEATHERFORD, TEXAS.

PLOW.

SPECIFICATION forming part of Letters Patent No. 481,630, dated August 30, 1892.

Application filed April 7, 1892. Serial No. 428,179. (No model.)

*To all whom it may concern:*

Be it known that I, OLE T. JENSEN, a citizen of the United States, residing at Weatherford, in the county of Parker and State of Texas, have invented a new and useful Plow, of which the following is a specification.

My invention relates to improvements in plows, the objects in view being to provide a cheap, simple, and durable construction of plow and adapt the same for a convenient adjustment of the handles to suit the height of the plowman, and also for a convenient adjustment of the standard, whereby the plow may be adapted to run deep or shallow.

With these objects in view the invention consists in certain features of construction hereinafter specified, and particularly pointed out in the claims.

Figure 1:
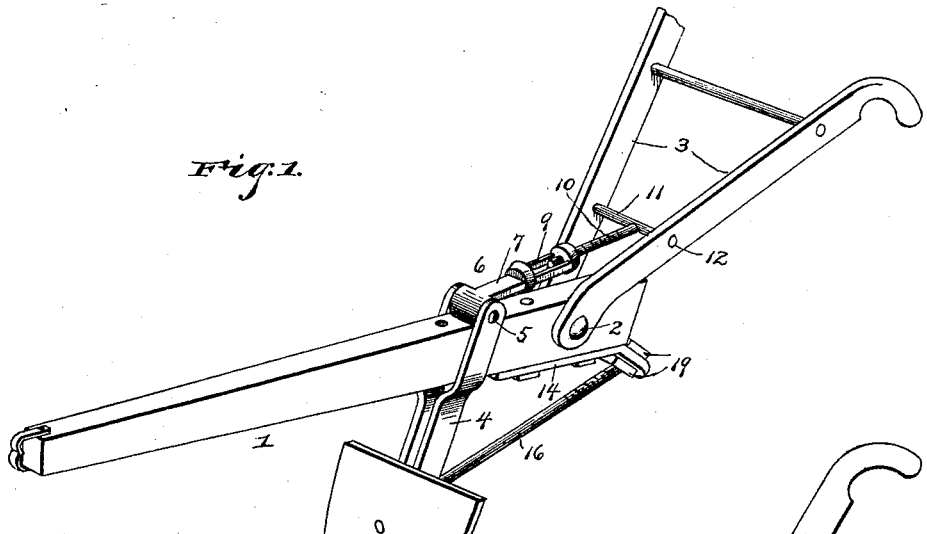
Figure 4:
Figure 2:
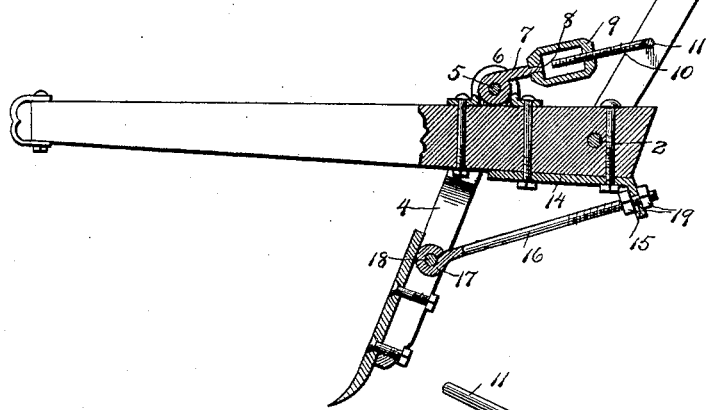
Figure 3:
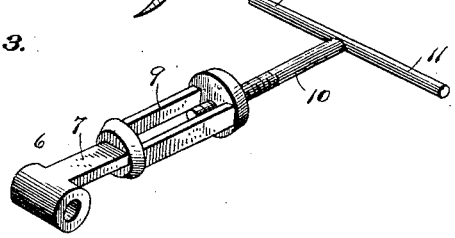

Referring to the drawings, Figure 1 is a perspective view of a plow embodying my invention. Fig. 2 is a longitudinal section of the same. Fig. 3 is a detail in perspective of the adjusting device between the upper end of the plow-standard and the handles. Fig. 4 is a detail in perspective of the bearing-plate.

Like numerals of reference indicate like parts in all the figures of the drawings.

1 designates the beam, to which near its rear end is pivotally bolted at 2 the lower ends of the pair of handles 3, which embrace the beam. The standard 4 is bifurcated, and its bifurcations receive, embrace, and extend above the beam 1. A bolt 5 passes through the bifurcations above the beam, and upon the bolt between the bifurcations there is interposed a shackle 6, bored to receive the bolt and surmounted by a bearing-plate 6ª. This shackle has a stem 7 projecting from its head, and the stem has its rear end reduced to form a tenon 8, upon which is swiveled a turnbuckle 9.

10 designates a T-shaped coupling, the head or transverse portions 11 thereof passing through bearing eyes or perforations 12, formed in the handles and the stem portion threaded and received by the rear end of the turnbuckle. A bent plate 14 is bolted to the under side near the rear end of the beam, and the same has a perforation 15, through which passes the rear threaded end of an inclined rod 16. The front or lower end of the rod has a perforated eye 17, and is pivotally connected by a bolt 18 to the lower end of the standard 4. A pair of burrs or nuts 19 are located upon the threaded portion of the rod above and below the bent perforated plate.

This completes the construction of the plow, whose operation and advantages may be stated as follows: By revolving the turnbuckle in one direction—that is, so as to draw the T-shaped coupling to the front—it will be seen and at once obvious that the handles will be swung upwardly upon their pivot-bolt 2, and thus may be adjusted for a tall plowman. By reversing the rotation of the turnbuckle the T-shaped coupling is moved to the rear, and thus the handles are lowered to adapt them to short plowmen. Such adjustments may be readily secured without the use of tools, and therefore directly upon the field of operation, saving the trouble of going to the tool-house for a wrench or other tool usually required. Furthermore, by adjusting the nuts or burrs 19 at various points upon the threaded rod the latter is caused to move in and out through the perforation of the bent plate, and, the shackle at the upper end of the standard serving as a fulcrum, the standard is thereby given more or less inclination and the plow made to penetrate more or less deeply into the ground.

Having described my invention, what I claim is—

1. In a plow, the combination, with the beam, the opposite pivoted handles at the rear ends of the same, and the bifurcated standard embracing the beam and secured thereto, a bolt passing through the bifurcations of the standards above the beam, of a shackle having a perforated head mounted on the bolt, and a rearwardly-disposed stem terminating in a tenon, a turnbuckle swiveled on the tenon, a T-shaped coupling having its transverse portions engaging perforations in the handles and its stem threaded and engaged by the rear end of the turnbuckle, substantially as specified.

2. A plow consisting of the plow-beam, the opposite pivoted and perforated handles, and the bifurcated standard embracing and extending above the beam, the perforated bent plate bolted to the under side of and extending in rear of the beam, the threaded rod passed through the perforation of the plate and having its front end pivotally bolted to the standard near the lower end of the latter, nuts located upon the rod above and below the plate, the bolt passed through the upper ends of the bifurcations above the beam, the shackle pivoted on the bolt, the plate surmounting the shackle, the turnbuckle swiveled on the shackle, and the T-shaped coupling having its transverse portions engaging perforations in the handles and having its threaded stem engaging the turnbuckle, substantially as specified.

In testimony that I claim the foregoing as my own I have hereto affixed my signature in the presence of two witnesses.

OLE T. JENSEN.

Witnesses:
   MARTIN W. LITTLETON,
   A. C. R. MORGAN.